UNITED STATES PATENT OFFICE.

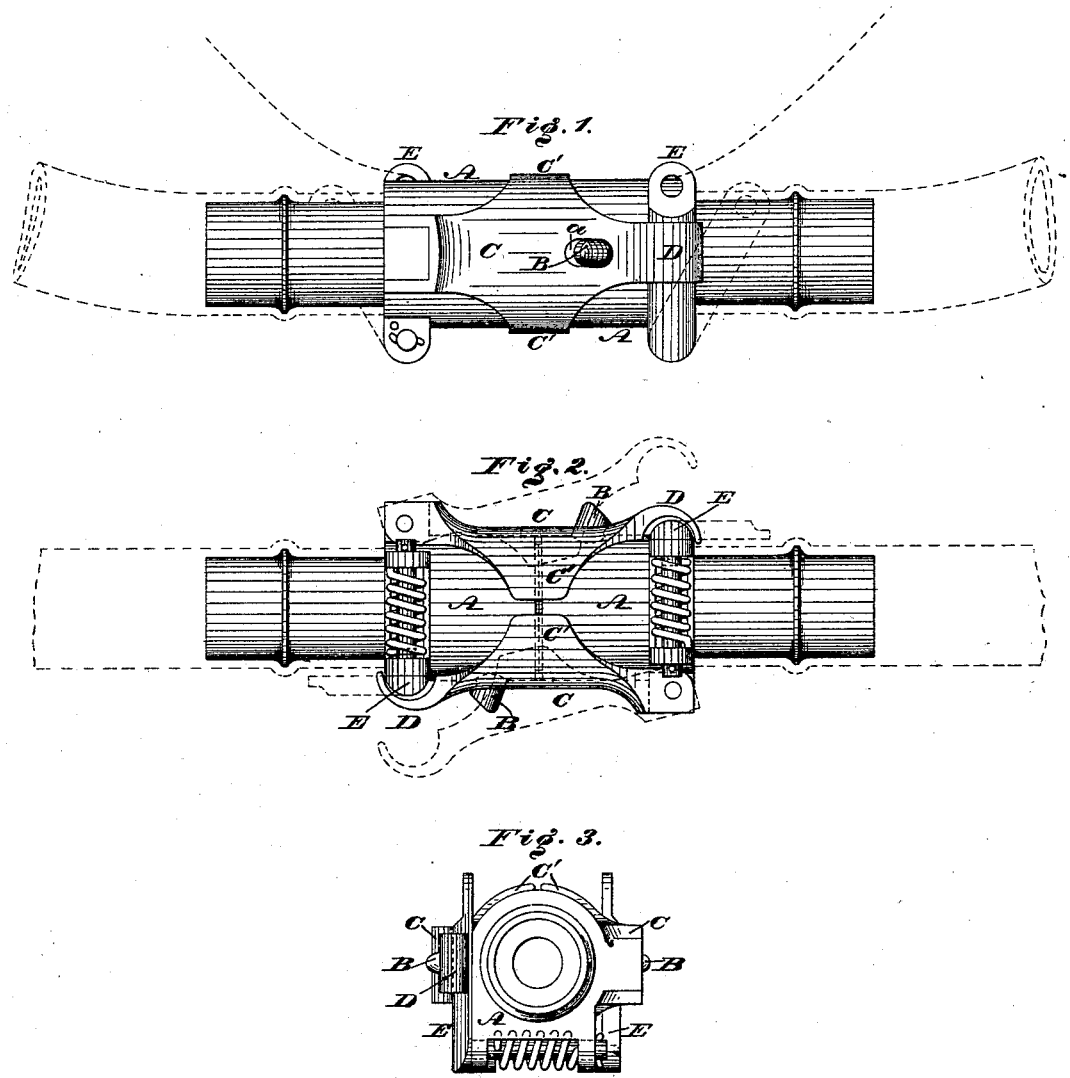

WILLIAM F. CASSEDY, OF CAPE MAY, NEW JERSEY, ASSIGNOR TO THE CASSEDY COUPLING COMPANY OF NEW JERSEY.

PIPE OR HOSE COUPLING.

SPECIFICATION forming part of Letters Patent No. 285,732, dated September 25, 1883.

Application filed April 21, 1883. (No model.)

*To all whom it may concern:*

Be it known that I, WILLIAM F. CASSEDY, a citizen of the United States, residing at Cape May, in the county of Cape May, State of New Jersey, have invented a new and useful Improvement in Pipe or Hose Couplings, which improvement is fully set forth in the following specification and accompanying drawings, in which—

Figures 1 and 2 are views of opposite sides of couplings embodying my invention. Fig. 3 is an end view thereof.

Similar letters of reference indicate corresponding parts in the several figures.

My invention consists of a coupling for pipe, hose, &c., provided with means whereby the parts thereof may be disconnected, and, furthermore, when the parts or objects to which the opposite pipes or lengths of hose may be attached separate or are uncoupled, as in the case of cars, the clamps of the coupling are automatically released, and the coupling is thereby disconnected.

Referring to the drawings, A represents the opposite collars of the coupling, and B represents studs which project from the exterior of the collars for the engagement of the coupling-clamps C, each of the latter being hinged or pivoted to the respective collar on the side opposite the stud, and having an opening, *a*, for the reception of the stud of the opposite collar, it being noticed that when the collars are brought together, and one clamp and the opposite stud are engaged, the other clamp is forced against its stud and engaged therewith, after the manner of a snap, the effect whereof is to force the collars firmly against each other, the gasket or packing being powerfully compressed, a close and tight joint is produced, and the parts are reliably coupled. When the pipe or hose is to be uncoupled, either clamp is forced away from the engaging stud, and as the other clamp loses its hold on its stud the collars are immediately disengaged. The sides of the clamp are extended to form guards C', which prevent exposure of the side edges of said clamps and the contiguous edges of the collars.

D represents horns which are formed on the ends of the clamps opposite to the hinged or pivotal ends thereof, the same being of curved form, so that the extreme ends point inwardly toward the collars or extensions thereof. The horns provide means for taking hold of the clamps for manipulation thereof in locking and unlocking the coupling, and also form guards which prevent accidental displacement of the clamps, as the extreme ends of the horns are relieved of liability to be struck by blows either directly applied or occasioned when the connected pipe or hose is being dragged from place to place.

E represents levers which are pivoted to the sides of the collars, and so disposed that when the clamps are in locking position the ends of the levers opposite to their pivots are beneath or behind the horns of the clamps. The levers have properly connected with them springs which hold them in locking positions and restore them to their normal positions when moved or disturbed, said springs in the present case encircling the journals of the levers and connected with said journals and the collars of the coupling.

It will be seen that by moving the levers in the direction from the collars they press against the inner faces of the outer ends of the horns, and thus force out the clamps, whereby the latter are disengaged from the studs and the collars are uncoupled.

In lieu of the levers E, I may employ rotary cams, which are pivoted to the collars and adapted to press against the horns, with results similar to the employment of said levers.

For purposes of air-brakes, heat-conveyers, &c., of cars, the levers E are connected with the trucks of adjacent cars, the connections being cords, chains, links, &c., sufficiently long so as not to disturb the levers under ordinary circumstances. Should, however, the cars be uncoupled, either purposely or from accident, the connections are drawn out, thus operating the levers E and automatically disconnecting the coupling, or uncoupling the connected lengths of pipe or hose, as is evident.

Having thus described my invention, what I claim as new, and desire to secure by Letters Patent, is—

1. In a pipe or hose coupling, the collars, each having a stud, in combination with hinged or pivoted clamps, each having an opening and a terminal horn, D, the latter pointing inwardly toward the collar, substantially as and for the purpose set forth.

2. A pipe or hose coupling provided with a clamp and a spring-retracted disengaging device therefor, substantially as and for the purpose set forth.

3. A pipe or hose coupling provided with collars having clamping devices and spring-retracted levers adapted to disengage the same, substantially as and for the purpose set forth.

W. F. CASSEDY.

Witnesses:
A. P. HILDRETH,
JAMES M. E. HILDRETH.